(12) United States Patent
Lewis et al.

(10) Patent No.: US 10,513,931 B2
(45) Date of Patent: Dec. 24, 2019

(54) COOLING SYSTEMS AND INTERNALLY-COOLED ENGINE PARTS HAVING AN IMPINGEMENT CAVITY WITH AN UNDULATING INTERNAL SURFACE

(71) Applicant: UNITED TECHNOLOGIES CORPORATION, Hartford, CT (US)

(72) Inventors: Scott D. Lewis, Vernon, CT (US); Kyle C. Lana, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 871 days.

(21) Appl. No.: 14/974,418

(22) Filed: Dec. 18, 2015

(65) Prior Publication Data
US 2017/0175538 A1 Jun. 22, 2017

(51) Int. Cl.
| | |
|---|---|
| F01D 5/18 | (2006.01) |
| F01D 5/14 | (2006.01) |
| F01D 9/04 | (2006.01) |
| F01D 11/08 | (2006.01) |
| F01D 25/12 | (2006.01) |
| F23R 3/00 | (2006.01) |

(52) U.S. Cl.
CPC ............. *F01D 5/187* (2013.01); *F01D 5/145* (2013.01); *F01D 5/147* (2013.01); *F01D 9/041* (2013.01); *F01D 11/08* (2013.01); *F01D 25/12* (2013.01); *F23R 3/002* (2013.01); *F05D 2220/32* (2013.01); *F05D 2240/24* (2013.01); *F05D 2240/301* (2013.01); *F05D 2240/35* (2013.01); *F05D 2260/201* (2013.01)

(58) Field of Classification Search
CPC .......... F01D 5/187; F01D 5/145; F01D 5/147; F01D 9/041; F01D 11/08; F01D 25/12
See application file for complete search history.

(56) References Cited

U.S. PATENT DOCUMENTS

| | | | | |
|---|---|---|---|---|
| 5,498,133 | A * | 3/1996 | Lee | ............ F01D 5/186 416/97 R |
| 6,142,734 | A * | 11/2000 | Lee | ............ F01D 5/189 249/117 |
| 2010/0254824 | A1* | 10/2010 | Naik | ............ F01D 5/186 416/97 R |

OTHER PUBLICATIONS

Extended European Search Report dated Apr. 25, 2017 in European Application No. 16204836.7.

* cited by examiner

*Primary Examiner* — Woody A Lee, Jr.
*Assistant Examiner* — Sabbir Hasan
(74) *Attorney, Agent, or Firm* — Snell & Wilmer, L.L.P.

(57) ABSTRACT

An airfoil is provided. The airfoil comprises a crossover and an impingement cavity in fluid communication with the crossover and having an internal surface. At least a portion of the internal surface comprises an undulating internal surface. A plurality of trip strips may be disposed on the at least a portion of the internal surface to define the undulating internal surface. A gas turbine engine and an internally-cooled engine part are also provided.

17 Claims, 11 Drawing Sheets

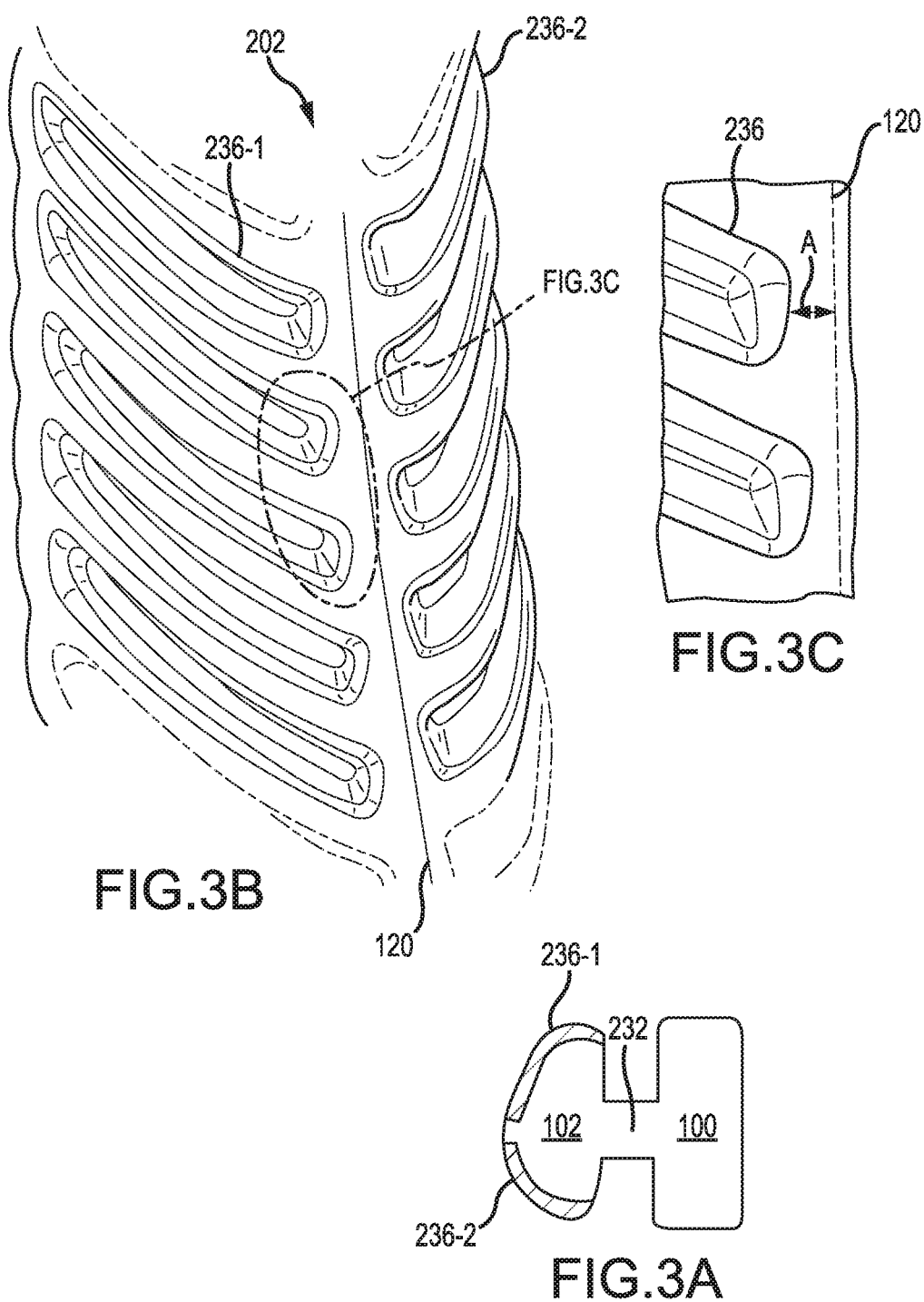

COOLING SYSTEMS AND INTERNALLY-COOLED ENGINE PARTS HAVING AN IMPINGEMENT CAVITY WITH AN UNDULATING INTERNAL SURFACE

FIELD

The present disclosure relates to gas turbine engines, and more specifically, to cooling systems and internally-cooled engine parts having an impingement cavity with an undulating surface.

BACKGROUND

Turbine airfoils or outer air seals operate in an environment where the gas temperatures often exceed the thermal capacity of materials in the engine. These parts may rely on cooling features to protect against damage. Cooling air from the compressor can be routed to provide internal convection cooling within the airfoils. However, engine efficiency may be reduced if higher amounts of cooling air are consumed. As demands increase for higher thrust and/or efficiency, the turbine inlet temperatures are increased while the gas allocated for cooling is reduced.

Some internally-cooled engine parts may implement air cooling systems with a series of internal cavities to cool a part. The internal cavities may be impingement cavities that include flow guides for air and/or coolant flowing through the impingement cavities. For various reasons, the leading edge of internally-cooled engine parts such as turbine blades and vanes may be particularly difficult to cool.

SUMMARY

An airfoil is provided, in accordance with various embodiments. The airfoil comprises a crossover and an impingement cavity in fluid communication with the crossover. The impingement cavity has an internal surface and at least a portion of the internal surface comprises an undulating internal surface.

A gas turbine engine is provided, in accordance with various embodiments. The gas turbine engine comprises an internally-cooled engine part and an impingement cavity disposed in the internally cooled engine part. The impingement cavity has an internal surface and at least a portion of the internal surface comprises an undulating internal surface.

An internally-cooled engine part is provided, in accordance with various embodiments. The internally-cooled engine part comprises a crossover and an impingement cavity in fluid communication with the crossover. The impingement cavity has an internal surface and at least a portion of the internal surface comprises an undulating internal surface. The crossover is configured to direct air toward the undulating internal surface of the impingement cavity.

In any of the foregoing embodiments, a plurality of trip strips are disposed on at least the portion of the internal surface of the impingement cavity to define the undulating internal surface. The plurality of trip strips are closely packed together in a selected pitch/height ratio to define the undulating internal surface. The undulating internal surface comprises at least one of an undulating internal suction-side surface or an undulating internal pressure-side surface of the impingement cavity. The impingement cavity comprises a leading edge impingement cavity. The impingement cavity comprises at least one of a leading edge impingement cavity, a mid-airfoil impingement cavity, or a trailing edge impingement cavity. A pitch of the plurality of trip strips is one to five times a height thereof. The crossover is a member of a plurality of crossovers. At least two crossovers of the plurality of crossovers are at least aligned with each other or staggered with each other. The plurality of trip strips may be filleted. The undulating internal surface comprises at least one of an undulating internal suction-side surface or an undulating internal pressure-side surface of the impingement cavity. The impingement cavity is disposed in an internally-cooled part comprising an airfoil, a blade outer air seal, an airfoil platform, or a combustor component.

BRIEF DESCRIPTION OF THE DRAWINGS

FIG. 3A illustrates a leading edge portion of the airfoil of FIG. 2, illustrating a leading edge feed cavity communicating with the leading edge impingement cavity by a crossover and the first plurality of trip strips disposed on the internal suction-side surface and the second plurality of trip strips disposed on the internal pressure-side surface, in accordance with various embodiments;

FIG. 3B illustrates the leading edge portion of the airfoil of FIG. 2, illustrating the first plurality of trip strips and the second plurality of trip strips contained in the leading edge impingement cavity and separated by a leading edge parting line;

FIG. 3C illustrates an enlarged view of an encircled region of FIG. 3B, illustrating by double-headed arrow the spacing between the leading edge parting line and the plurality of trip strips, in accordance with various embodiments;

Figure 1:
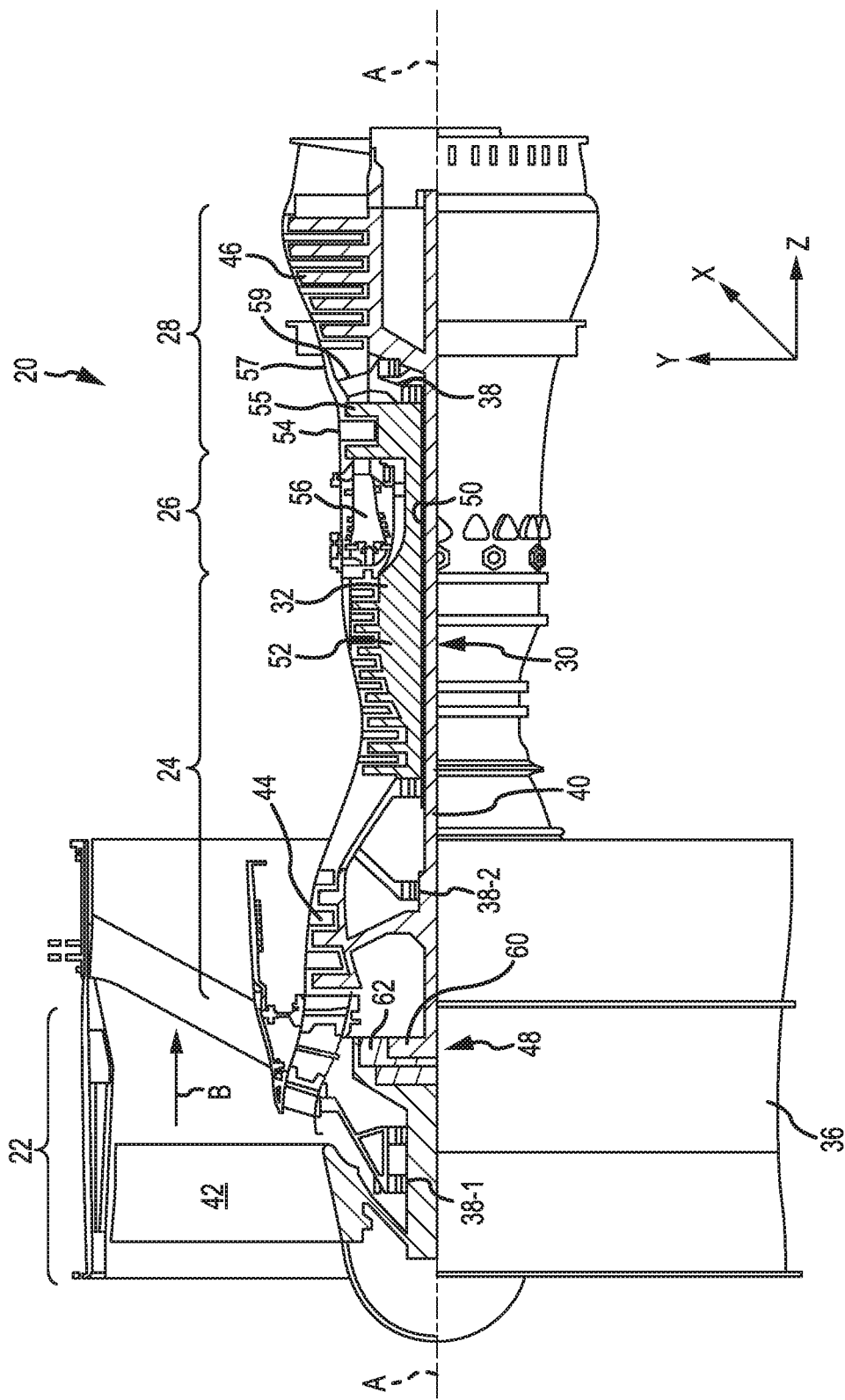
FIG. 1 illustrates an exemplary embodiment of a gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with the present inventions and the teachings herein. Thus, the detailed description herein is presented for purposes of illustration only and not of limitation. The scope of the present inventions is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Various embodiments are directed to cooling systems and internally-cooled engine parts having an impingement cavity with an undulating internal surface. As used herein, the term "undulating" means having a wavy surface with successive curves in alternate directions. As used herein, the term "undulating" includes wave geometries as well as geometries of other shapes as hereinafter described. As used herein, the term "closely-packed" trip strips means parallel trip strips with substantially no space between the trip strips such that an additional trip strip could not be packed between adjacent closely-packed trip strips. The trip strips are closely packed in a selected pitch/height ratio as hereinafter described to define the undulating internal surface. Various embodiments provide improved cooling of the internally-cooled engine parts, especially on internal surfaces with the highest external heat load that benefit from higher flow rates of cooling air, such as the airfoil leading edge. Various embodiments reduce the operating temperature of the internally-cooled part, reducing oxidation and creep thereof.

As used herein, "aft" refers to the direction associated with the tail (e.g., the back end) of an aircraft, or generally, to the direction of exhaust of the gas turbine. As used herein, "forward" refers to the direction associated with the nose (the front end) of an aircraft, or generally, to the direction of flight or motion. As used herein, "distal" refers to the direction radially outward, or generally, away from the axis of rotation of a turbine engine. As used herein, "proximal" refers to a direction radially inward, or generally, towards the axis of rotation of a turbine engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 of high-pressure turbine may rotate about the engine central longitudinal axis A-A'. Airfoil 55 may be an internally cooled component of gas turbine engine 20. Trip strips may be located in internal cooling cavities (impingement cavities) of internally cooled engine parts, as detailed further below. Internally cooled engine parts may be discussed in the present disclosure in terms of airfoils. However, the present disclosure applies to any internally cooled engine part (e.g., blade outer air seals (e.g., BOAS segment 250 of FIG. 9), airfoil platforms (e.g., airfoil platform 252 of FIG. 9), combustor components (254 of FIG. 1), or any other internally cooled component in a gas turbine engine).

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
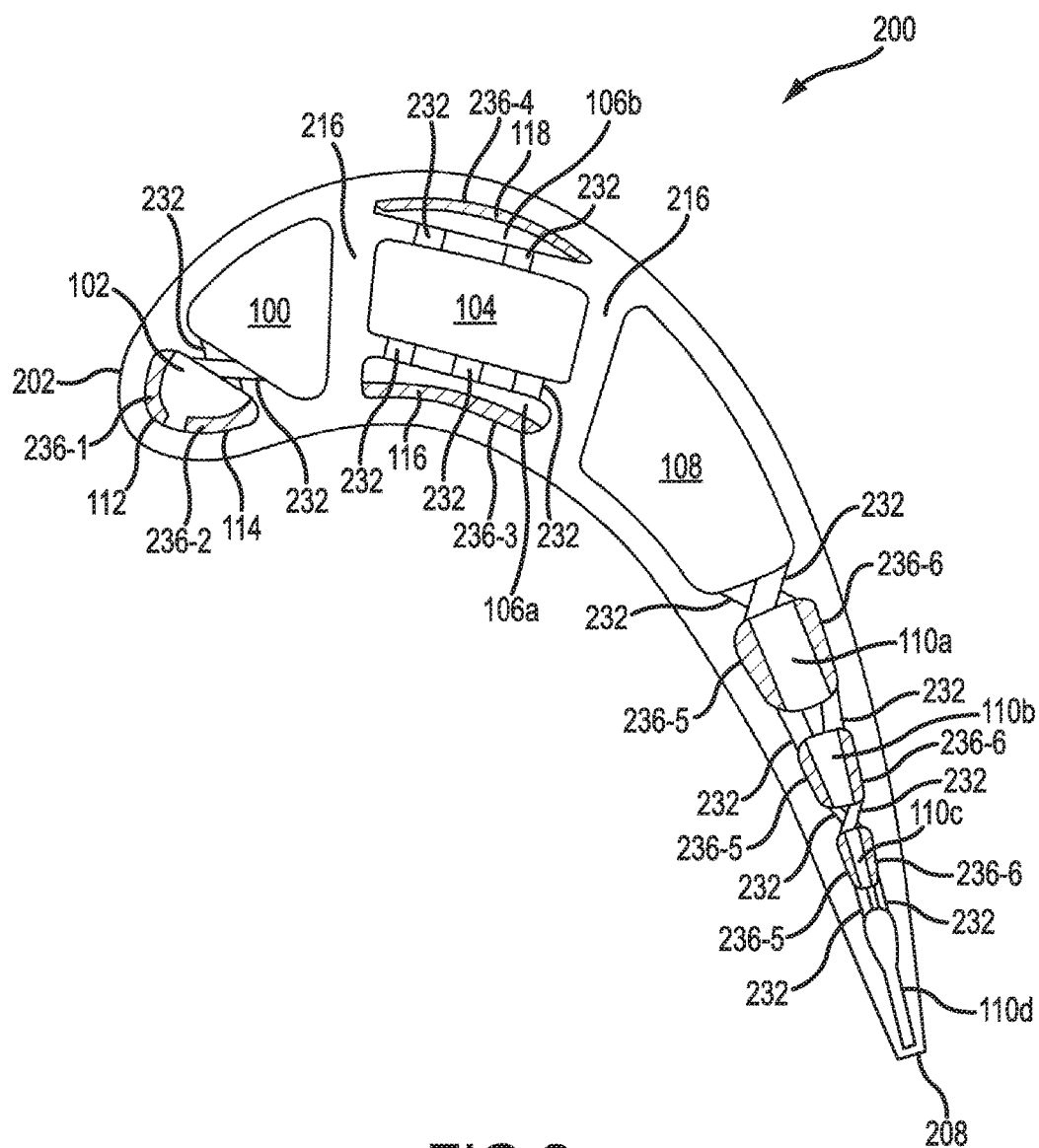
FIG. 2 illustrates a cross-sectional view of an airfoil with internal cavities for coolant flow, in accordance with various embodiments.
Figure 9:
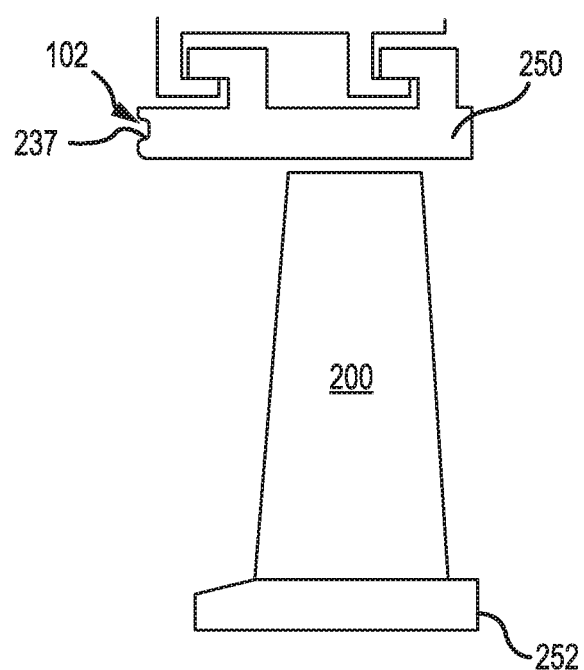
FIG. 9 is a schematic view of an exemplary airfoil extending from an airfoil platform and a blade outer air seal with an impingement cavity having an undulating internal surface, in accordance with various embodiments.

With reference to FIG. 2, an airfoil 200 with internal cavities for carrying coolant flow (e.g., air flow) is shown according to various embodiments. Although an airfoil is shown, the present disclosure applies to any internally-cooled part (e.g., blade outer air seals 250 (e.g., FIG. 9), airfoil platforms 252 (e.g., FIG. 9), combustor components, etc.). The airfoil 200 may comprise a leading edge 202 and a trailing edge 208. The air flowing through a gas turbine engine may first contact the leading edge 202. The air may flow along a suction side 204 and/or a pressure side 206 and leave the airfoil 200 at the trailing edge 208. The airfoil 200 may include the airfoil platform 252 (such as depicted in FIG. 9) and an attachment root.

Still referring to FIG. 2, the airfoil 200 is depicted as cutaway to illustrate the plurality of internal cavities 214 defined by a plurality of internal walls 216. The plurality of internal cavities may be located throughout the airfoil 200 and may provide internal cooling for airfoil 200. This disclosure contemplates any number of internal cavities being deployed in the internally-cooled part. The internal cavities depicted in FIG. 2 include a leading edge feed cavity 100 communicating with a leading edge impingement cavity 102, a mid-feed cavity 104 communicating with a pair of impingement cavities 106a and 106b, and a trailing edge feed cavity 108 communicating with a plurality of trailing edge impingement cavities 110a, 110b, 110c, and 110d, successively arranged toward the trailing edge 208. Each of the feed cavities 100, 104, and 108 communicate with the corresponding impingement cavity (ies) via a plurality of crossovers 232. The successive trailing edge impingement cavities 110a, 110b, 110c, and 110d also communicate with each other via crossovers 232. According to various embodiments, the crossover may be a narrow channel directing flow into the impingement cavity where the flow impinges on an internal surface thereof. The crossover may be oriented at an angle relative to the internal surface. At least two crossovers in the airfoil may be aligned with each other or may be staggered with each other. While the illustrated crossovers are oval, it is to be understood that the crossovers may be any shape.

Still referring to FIG. 2, according to various embodiments, the internal surface may comprise an undulating internal surface. According to various embodiments, the undulating internal surface may be defined by a plurality of trip strips 236 disposed on the internal surface of at least one of the impingement cavities 102, 106a and/or 106b, 110a through 110d in the airfoil 200 (see, e.g., FIGS. 7A and 79). In accordance with various embodiments, the trip strips 236 are closely packed to define at least one undulating internal surface of the impingement cavity. The undulating internal surface resembles a corrugated wall. The leading edge impingement cavity 102 in the airfoil 200 of FIG. 2 contains the plurality of trip strips 236 comprising a first plurality of trip strips 236-1 on an internal suction-side surface 112 and a second plurality of trip strips 236-2 on an internal pressure-side wall 114. Still referring to FIG. 2, according to various embodiments, the first mid-airfoil impingement cavity 106a of the pair of mid-airfoil impingement cavities contains the plurality of trip strips comprising a third plurality of trip strips 236-3 disposed on a mid-airfoil internal pressure-side surface 116 and the second mid-airfoil impingement cavity 106b of the pair of mid-airfoil impingement cavities contains a fourth plurality of trip strips 236-4 disposed on a mid-airfoil internal suction-side surface 118. As used herein, the terms "mid" and "mid-airfoil" do not necessarily correspond to a geometric midpoint of the airfoil and is used simply to refer to feed cavity 104 that is disposed between (in the middle of) the leading edge feed cavity 100 and the trailing edge feed cavity 108. Still referring to FIG. 2, according to various embodiments, each of the trailing edge impingement cavities, except for trailing edge impingement cavity 110d, is depicted as containing the plurality of trip strips disposed on a trailing edge internal suction-side wall and a trailing edge internal pressure-side wall. The plurality of trip strips on the trailing edge internal pressure-side wall are referred to as trailing edge trip strips 236-5 and the plurality of trip strips on the trailing edge internal suction-side wall are referred to herein as trailing edge trip strips 236-6. The plurality of trip strips are disposed on at least a portion of the internal surface of the impingement cavity or cavities.

Although the plurality of trip strips are shown in particular impingement cavities of FIG. 2, the plurality of trip strips 236 may be deployed in other impingement cavities in airfoil 200 to define an undulating internal surface. The plurality of trip strips may be deployed in a fewer or a greater number of the impingement cavities and may be disposed on at least a portion of other internal surfaces of the impingement cavity.

Referring now to FIGS. 3A through 3C, according to various embodiments, the leading edge of the airfoil of FIG. 2 is illustrated. FIG. 3A illustrates the leading edge feed cavity 100 communicating with the leading edge impingement cavity 102 via a pair of crossovers 232. As noted previously, the first plurality of trip strips 236-1 is disposed on the internal suction-side surface 112 and the second plurality of trip strips 236-2 is disposed on the internal pressure-side surface 114. A leading edge parting line 120 separates the first plurality of trip strips 236-1 and the second plurality of trip strip 236-2. The leading edge parting line 120 extends radially along the leading edge 202 of the airfoil 200. The leading edge parting line may be used for casting the airfoil with the plurality of trip strips defining the undulating internal surface of the impingement cavity. The leading edge parting line is where the two sides of the casting die meet. A gap (indicated by double-headed arrow A) is shown between the trip strips and the leading edge parting line in FIG. 3C. The gap is used for casting the airfoil. The trip strips 236-1 and 236-2 are at a distance A from the leading edge parting line 120. While the airfoils are described as cast to include the plurality of trip strips defining the undulating internal surface of the impingement cavit(ies), it is to be understood that the internally-cooled part may be manufactured by other methods. For example, the internally cooled part may be manufactured by additive-manufacturing techniques.

Figures 4A, 4B:
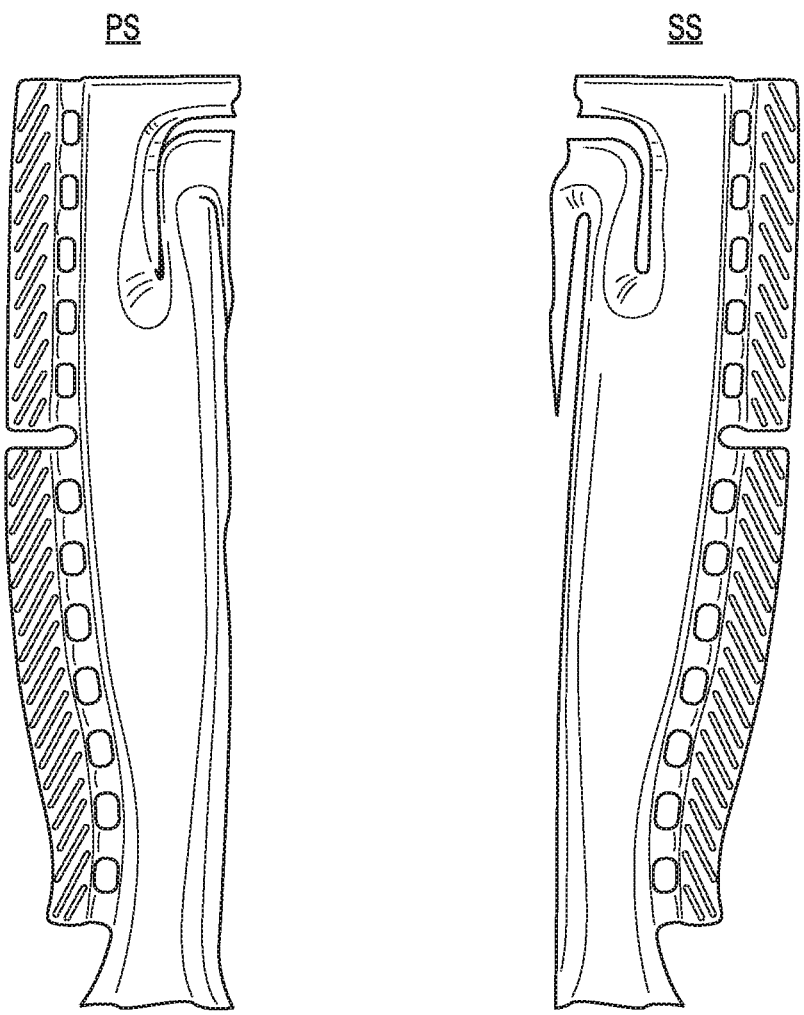
FIGS. 4A and 4B illustrates a leading edge impingement cavity of the airfoil of FIG. 2, illustrating a first plurality of trip strips (non-filleted) disposed on an internal suction-side surface to define an undulating internal suction-side surface (FIG. 4A) and a second plurality of trip strips (non-filleted) on an internal pressure-side surface to define an undulating internal pressure-side surface (FIG. 4B), in accordance with various embodiments.
Figures 5A, 5B:
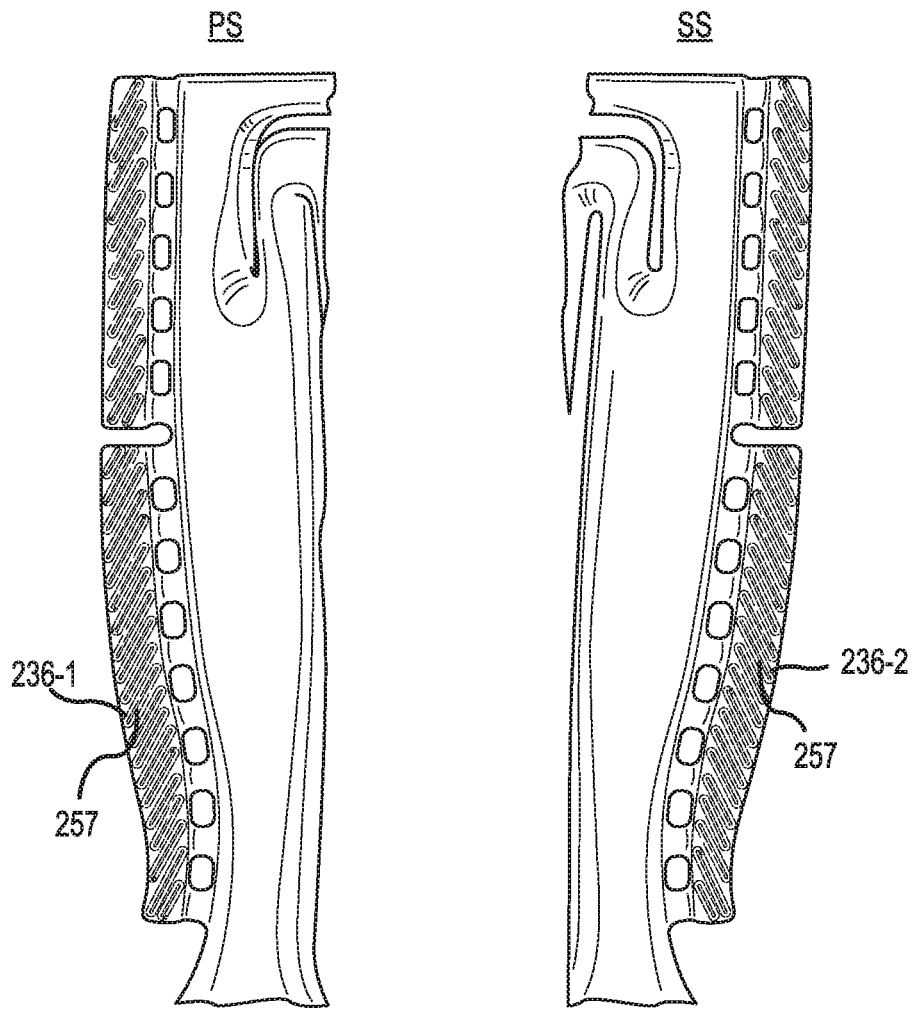
FIGS. 5A and 5B is the same view of the leading edge impingement cavity of FIGS. 4A and 4B, illustrating the first plurality of trip strips with a fillet (filleted trip strips) (FIG. 5A) and the second plurality of trip strips with a fillet (filleted trip strips) (FIG. 5B), in accordance with various embodiments.
Figure 6A:
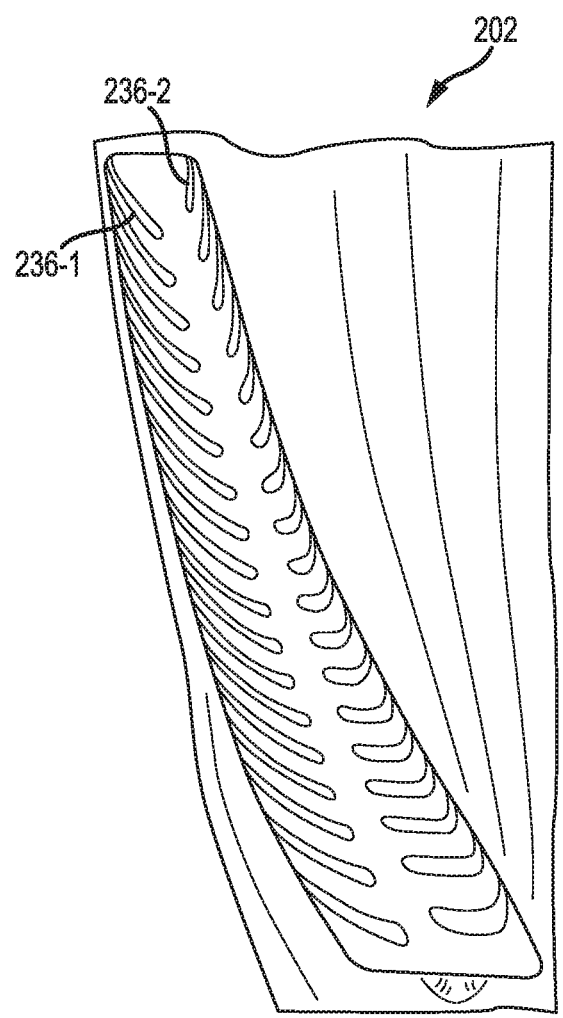
FIGS. 6A and 6B is a view from the leading edge of the airfoil of FIG. 3, illustrating the non-filleted trip strips (FIG. 6A) and the filleted trip strips (FIG. 6B), in accordance with various embodiments.
Figure 6B:
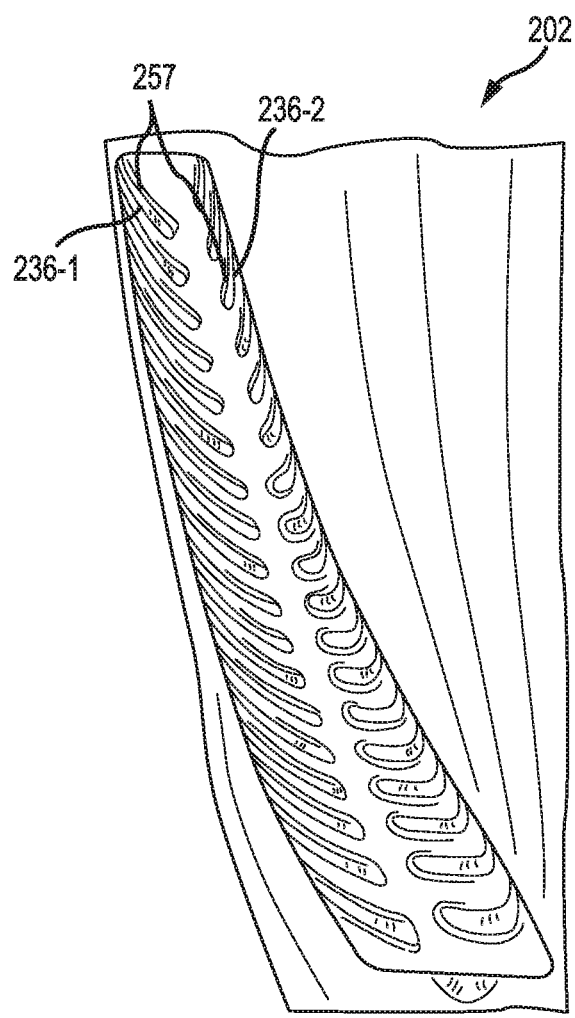

Returning now specifically to FIGS. 4A and 4B, in accordance with various embodiments and as noted previously, the leading edge impingement cavity 102 of the airfoil 200 may contain the first plurality of trip strips 236-1 disposed on the internal suction-side surface 112 and the second plurality of trip strips 236-2 disposed on the internal pressure-side surface 114 for directing cooling flow through the leading edge impingement cavity 102. The internal pressure-side surface 114 is shown opposite the internal suction-side surface 112 in the leading edge impingement cavity 102. An undulating internal suction-side surface defined by the first plurality of trip strips 236-1 and an undulating internal pressure-side surface defined by the second plurality of trip strips 236-2 are depicted. The first and second plurality of trip strips 236-1 and 236-2 depicted in FIGS. 4A and 4B are not filleted. The first and second plurality of trip strips 236-1 and 236-2 depicted in FIGS. 5A and 5B are filleted trip strips. The first and second plurality of trip strips of FIGS. 4A and 4B contained in the leading edge impingement cavity are shown from the leading edge in FIG. 6A. The first and second plurality of (filleted) trip strips of FIGS. 5A and 5B contained in the leading edge impingement cavity are shown from the leading edge in FIG. 6B. The fillets of the filleted trip strips are identified as fillets 257.

Figure 7A:
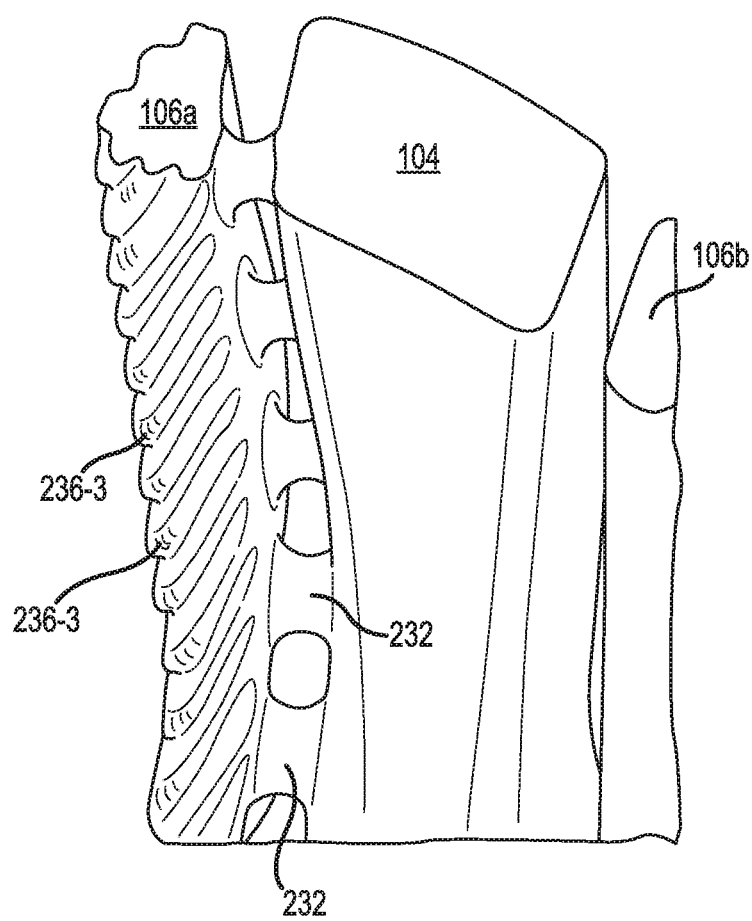
FIG. 7A illustrates a first radial span of the airfoil of FIG. 2, illustrating the undulating mid-airfoil internal suction-side surface of a first mid-foil impingement cavity communicating with a mid-airfoil feed cavity by a plurality of crossovers, in accordance with various embodiments.
Figure 7B:
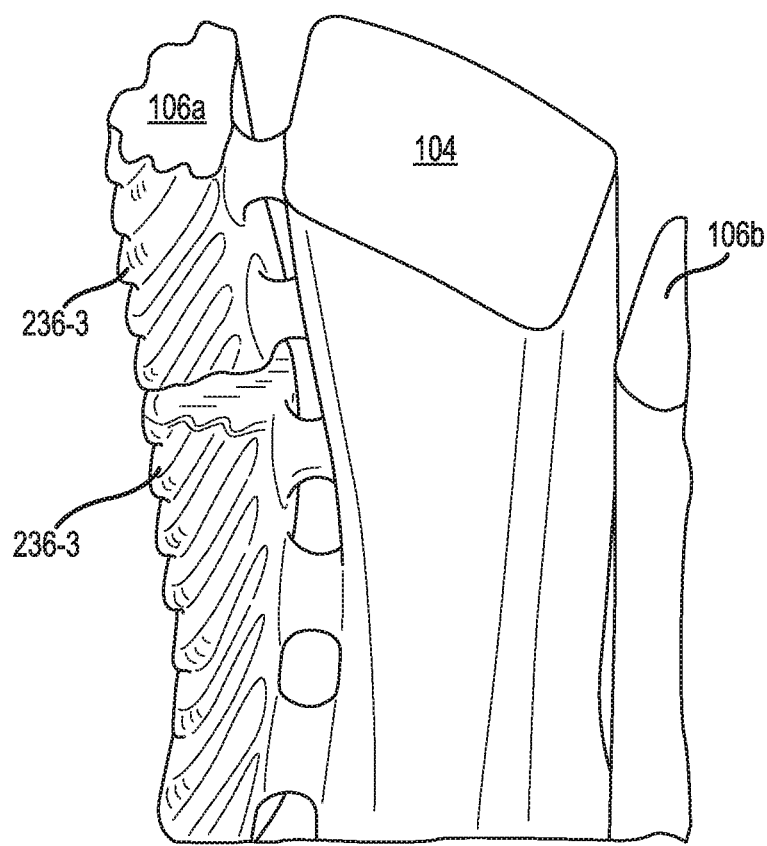
FIG. 7B is similar to FIG. 7A, but taken through a second radial span of the airfoil of FIG. 2, in accordance with various embodiments.

FIGS. 7A and 7B illustrate, in a three-dimensional view, different radial span cuts taken through the mid-foil feed cavity 104 and the pair of mid-foil impingement cavities 106a and 106b of the airfoil 200 of FIG. 2, in accordance with various embodiments. The mid-foil feed cavity 104 is depicted as communicating with the first mid-foil impingement cavity 106a via crossovers 232. As noted previously, the first mid-foil impingement cavity 106a of the pair of mid-foil impingement cavities contains the third plurality of trip strips 236-3 to define an undulating mid-airfoil internal suction-side surface as depicted in FIGS. 7A and 7B.

While the trip strips are described as contained within the impingement cavity of an airfoil, it is to be understood that any aircraft part using or comprising a part of an internal impingement cavity to provide cooling may include the plurality of trip strips in a closely packed arrangement to provide the undulating internal surface of the impingement cavity. For example, a blade outer air seal that includes an internal impingement cavity to provide cooling may include at least one undulating internal surface of the impingement cavity. As noted previously, other internally-cooled parts may include an airfoil platform, a combustor component, etc., any of which may include at least one impingement cavity containing a plurality of trip strips in a closely packed arranged and disposed on an internal surface of the impingement cavity to define the undulating internal surface of the impingement cavity. While the depicted trip strips include wave geometry, it is to be understood that the geometry and orientation of the trip strips may vary according to various embodiments. Moreover, a surface may have a mix of trip strips with different geometries and orientation. Similarly, trips strips on opposing surfaces may vary. Furthermore, this disclosure contemplates any trip strip geometry and orientation being deployed in an impingement cavity. While an undulating internal surface defined by trip strips has been described, it is to be understood that the undulating internal surface may be defined by other than trip strips.

In operation, the crossover 232 may be a narrow channel directing flow into the respective impingement cavity where flow impinges on the undulating internal surface. The crossover 232 may direct flow as a jet onto the undulating internal surface. In that regard, the crossover 232 may be oriented at an angle relative to the undulating internal surface. In various embodiments, a cooling flow of air may eject from crossover 232. The cooling flow flows from crossovers 232 and contacts the undulating internal surface on a forward end (more particularly, the plurality of trip strips 236 disposed on the impinged undulating internal surface), which is adjacent to the cross overs. The cooling air flowing into the impingement cavity initially spreads and then follows roughly along the contour of the plurality of trip strips 236 and across the undulating internal surface to an aft end of the undulating internal surface. The trip strips 236 may direct the flow within the impingement cavity along the undulating internal surface 237. In that regard, trip strips 236 may have a tendency to prevent the flow from moving radially outward as airfoil 200 rotates (as airfoil 55 from FIG. 1 rotates about engine central longitudinal axis A-A'). The plurality of trip strips 236 provide increased surface area along the undulating internal surface to improve heat transfer between the surface of airfoil 200 and the coolant making up flow. The flow may then be ejected from the impingement cavity by way of an exit passage (that may include cooling holes) before being ejected from the airfoil 200. Part of the cooling air flow may then exit through the exit passage (that may include cooling holes) while the remainder of the cooling air flow is directed onto other undulating internal surfaces of the impingement cavity.

Figure 8:
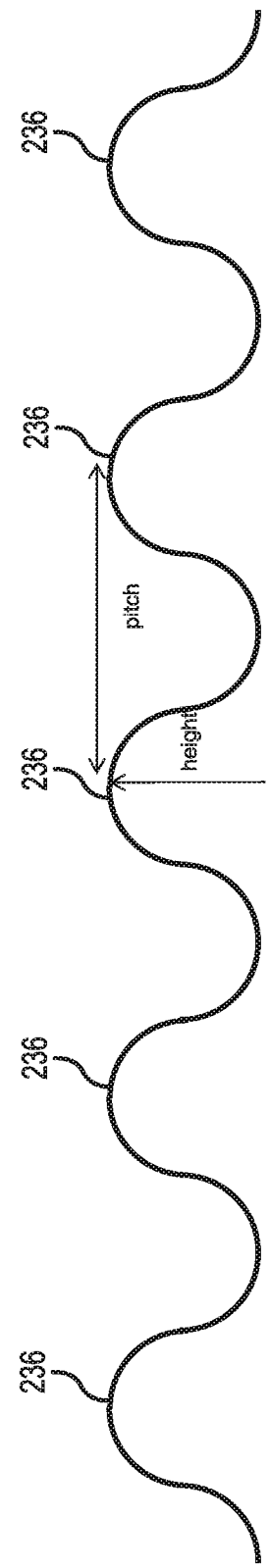
FIG. 8 is a schematic view of an exemplary internal surface of an impingement cavity of the airfoil of FIG. 2, illustrating the pitch/height ratio of the trip strips disposed on the exemplary internal surface, in accordance with various embodiments.

Trip strips 236 may act as a turbulator as well as a guide structure to air flow in the impingement cavity. Because of the larger pitch to height ratio relative to conventionally arranged trip strips, the closely packed arrangement of trip strips defines the undulating internal surface and provide improved cooling of internally-cooled parts. FIG. 8 graphically illustrates the pitch/height ratio of the trip strip arrangement according to various embodiments. The trip strip arrangement of FIG. 8 has a pitch to height ratio in various embodiments of between about two and five, in various embodiments of between about one and five, and in various embodiments of between about 0.5 and 3. The pitch (defined as the distance measured between the centerpoint of two adjoining crests (a crest is defined as the peak of a trip strip) is significantly shorter than in conventional trip strip arrangements, according to various embodiments. As a result, the trip strips 236 defining the undulating internal surface of the impingement cavity provides even greater surface area than conventional trip strips, thereby increasing increase heat transfer between the undulating internal surface and the cooling air and contributing to the improved cooling of internally-cooled parts. Oxidation and creep of the internally-cooled parts is reduced.

From the foregoing, it is to be appreciated that as various embodiments provide improved cooling of the internally-cooled engine parts, especially the internal surfaces with higher external heat load that would benefit from improved cooling, such as the airfoil leading edge, the operating temperature of the internally-cooled part is reduced.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil, comprising:
   a feed cavity;
   an impingement cavity in fluid communication with the feed cavity, wherein at least a portion of an internal surface of the impingement cavity comprises an undulating internal surface;
   a first crossover fluidly coupling the feed cavity and the impingement cavity, wherein the first crossover is oriented at a first angle relative to the internal surface of the impingement cavity, wherein the first crossover is configured such that a first fluid flow ejected from the first crossover impinges on a first portion of the undulating internal surface of the impingement cavity;
   a second crossover fluidly coupling the feed cavity and the impingement cavity, wherein the second crossover is radially aligned with the first crossover, and wherein the second crossover is oriented at a second angle relative to the internal surface of the impingement cavity, the second angle being different from the first angle, and wherein the second crossover is configured such that a second fluid flow ejected from the second crossover impinges on a second portion of the undulating internal surface of the impingement cavity.

2. The airfoil of claim 1, wherein the impingement cavity comprises at least one of a leading edge impingement cavity, a mid-airfoil impingement cavity, or a trailing edge impingement cavity.

3. The airfoil of claim 1, wherein the first crossover and the second crossover are members of a plurality of crossovers.

4. The airfoil of claim 3, wherein at least two crossovers of the plurality of crossovers are radially aligned with each other and oriented at the first angle.

5. The airfoil of claim 1, wherein the undulating internal surface comprises at least one of an undulating internal suction-side surface or an undulating internal pressure-side surface of the impingement cavity.

6. The airfoil of claim 1, wherein the undulating internal surface is defined by a plurality of trip strips disposed on the internal surface of the impingement cavity.

7. The airfoil of claim 6, wherein the plurality of trip strips are closely packed together in a selected pitch/height ratio to define the undulating internal surface.

8. The airfoil of claim 7, wherein a pitch of the plurality of trip strips is one to five times a height thereof.

9. The airfoil of claim 6, wherein the plurality of trip strips is filleted.

10. A gas turbine engine comprising:
    an internally-cooled engine part;
    an impingement cavity disposed in the internally-cooled engine part, wherein at least a portion of an internal surface of the impingement cavity comprises an undulating internal surface;
    a first crossover fluidly coupled to the impingement cavity and oriented at a first angle relative to the internal surface of the impingement cavity, wherein the first crossover is configured such that a first fluid flow ejected from the first crossover impinges on a first portion of the undulating internal surface of the impingement cavity; and
    a second crossover radially aligned with the first crossover, wherein the second crossover is oriented at a second angle relative to the internal surface of the impingement cavity, the second angle being different from the first angle, and wherein the second crossover is configured such that a second fluid flow ejected from the second crossover impinges on a second portion of the undulating internal surface of the impingement cavity.

11. The gas turbine engine of claim 10, wherein the internally-cooled engine part is at least one of a blade outer air seal, an airfoil platform, or a combustor component.

12. The gas turbine engine of claim 10, wherein the internally-cooled engine part comprises an airfoil, and wherein the impingement cavity is at least one of a leading edge impingement cavity, a mid-airfoil impingement cavity, or a trailing edge impingement cavity.

13. The gas turbine engine of claim 12, wherein the undulating internal surface comprises at least one of an undulating internal suction-side surface or an undulating internal pressure-side surface of the impingement cavity.

14. The gas turbine engine of claim 10, wherein a plurality of trip strips are disposed on the at least a portion of the internal surface of the impingement cavity to define the undulating internal surface.

15. The gas turbine engine of claim 14, wherein the plurality of trip strips are closely packed together in a selected pitch/height ratio to define the undulating internal surface.

16. The gas turbine engine of claim 15, wherein a pitch of the plurality of trip strips is about one to about five times a height thereof.

17. An internally-cooled engine part, comprising:
- a feed cavity; and
- an impingement cavity in fluid communication with the feed cavity, wherein an internal surface of the impingement cavity comprises an undulating internal surface, and wherein a plurality of trip strips is disposed on the internal surface of the impingement cavity to define the undulating internal surface, and wherein a pitch of the plurality of trip strips is two to five times a height of the plurality of trip strips;
- a first crossover fluidly coupling the feed cavity and the impingement cavity, wherein the first crossover is configured to direct air toward a first portion of the undulating internal surface of the impingement cavity, and wherein the first crossover is oriented at a first angle relative to the internal surface of the impingement cavity, and wherein the first crossover is configured such that a first fluid flow ejected from the first crossover impinges on the first portion of the undulating internal surface of the impingement cavity; and
- a second crossover fluidly coupling the feed cavity and the impingement cavity, wherein the second crossover is radially aligned with the first crossover, and wherein the second crossover is configured to direct air toward a second portion of the undulating internal surface of the impingement cavity, and wherein the second crossover is oriented at a second angle relative to the internal surface of the impingement cavity, the second angle being different from the first angle, and wherein the second crossover is configured such that a second fluid flow ejected from the second crossover impinges on the second portion of the undulating internal surface of the impingement cavity.

* * * * *